US009791935B2

(12) United States Patent
Trattler et al.

(10) Patent No.: US 9,791,935 B2
(45) Date of Patent: Oct. 17, 2017

(54) METHOD FOR GESTURE DETECTION, OPTICAL SENSOR CIRCUIT, IN PARTICULAR AN OPTICAL SENSOR CIRCUIT FOR GESTURE DETECTION, AND OPTICAL SENSOR ARRANGEMENT FOR GESTURE DETECTION

(71) Applicant: ams AG, Unterpremstaetten (AT)

(72) Inventors: Peter Trattler, Graz (AT); Mario Manninger, Unterpremstaetten (AT)

(73) Assignee: AMS AG, Unterpremstaetten (AT)

( * ) Notice: Subject to any disclaimer, the term of this patent is extended or adjusted under 35 U.S.C. 154(b) by 38 days.

(21) Appl. No.: 14/783,760

(22) PCT Filed: Apr. 4, 2014

(86) PCT No.: PCT/EP2014/056839
§ 371 (c)(1),
(2) Date: Oct. 9, 2015

(87) PCT Pub. No.: WO2014/166844
PCT Pub. Date: Oct. 16, 2014

(65) Prior Publication Data
US 2016/0070358 A1 Mar. 10, 2016

(30) Foreign Application Priority Data

Apr. 9, 2013 (EP) ..................... 13162964

(51) Int. Cl.
*G06F 3/042* (2006.01)
*G06F 3/01* (2006.01)
(Continued)

(52) U.S. Cl.
CPC ............ *G06F 3/017* (2013.01); *G06F 3/0304* (2013.01); *G06K 9/00355* (2013.01)

(58) Field of Classification Search
CPC .... G06F 3/017; G06F 3/0304; G06K 9/00355
See application file for complete search history.

(56) References Cited

U.S. PATENT DOCUMENTS

| 2005/0226505 | A1 | 10/2005 | Wilson | |
|---|---|---|---|---|
| 2009/0033623 | A1* | 2/2009 | Lin | ......................... G06F 3/014 345/158 |

(Continued)

FOREIGN PATENT DOCUMENTS

| CN | 101655739 A | 2/2010 |
|---|---|---|
| CN | 202795231 U | 3/2013 |

OTHER PUBLICATIONS

Datasheet BH1771GLC: "Monolithic Optical Proximity/Ambient Light Sensor", ROHM Co., Ltd., Catalog No. 52F623OE, Sep. 30, 2009 ROHM.

*Primary Examiner* — Adam R Giesy
(74) *Attorney, Agent, or Firm* — McDermott Will & Emery LLP

(57) ABSTRACT

A method for gesture detection comprises pre-processing and main-processing steps, wherein the pre-processing comprises emitting light using a light emitting device and generating of directional sensor signals as a function of time by detecting a fraction of the emitted light reflected by means of a movable object using a directional light sensor array). The main-processing comprises calculating coordinates as a function of time by using the directional sensor signals, being indicative of a position of the object with reference to a plane parallel to a principal plane of the light sensor array, and detecting a movement of the object depending on the timing of the coordinates.

21 Claims, 5 Drawing Sheets

(51) Int. Cl.
    *G06F 3/03*     (2006.01)
    *G06K 9/00*     (2006.01)

(56) References Cited

U.S. PATENT DOCUMENTS

| | | | |
|---|---|---|---|
| 2010/0150399 A1* | 6/2010 | Svajda | G06K 9/2027 |
| | | | 382/103 |
| 2010/0167783 A1 | 7/2010 | Alameh et al. | |
| 2010/0245289 A1* | 9/2010 | Svajda | G06F 3/0421 |
| | | | 345/175 |
| 2010/0299642 A1 | 11/2010 | Merrell et al. | |
| 2012/0050258 A1 | 3/2012 | Kay et al. | |
| 2012/0133624 A1 | 5/2012 | Castagner et al. | |
| 2013/0334398 A1* | 12/2013 | Earman | G06K 9/00355 |
| | | | 250/206.1 |

* cited by examiner

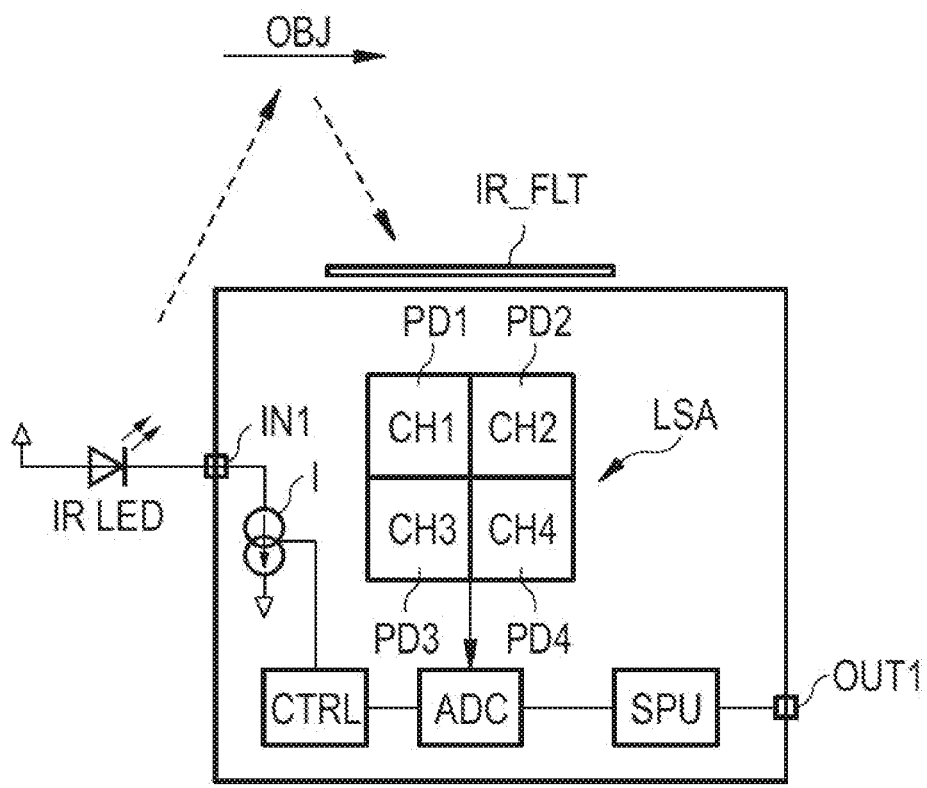
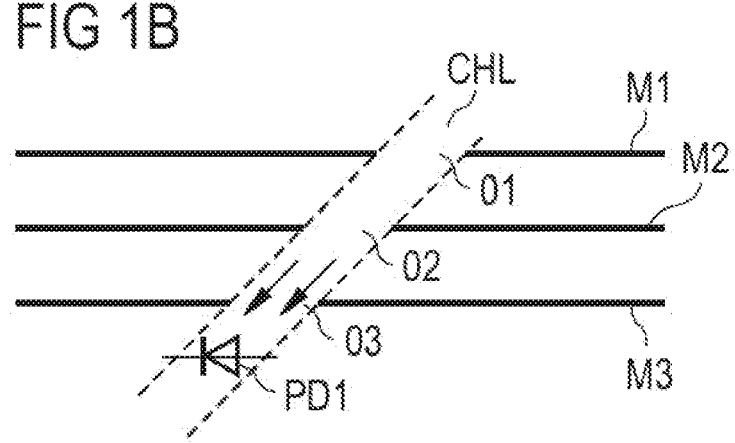

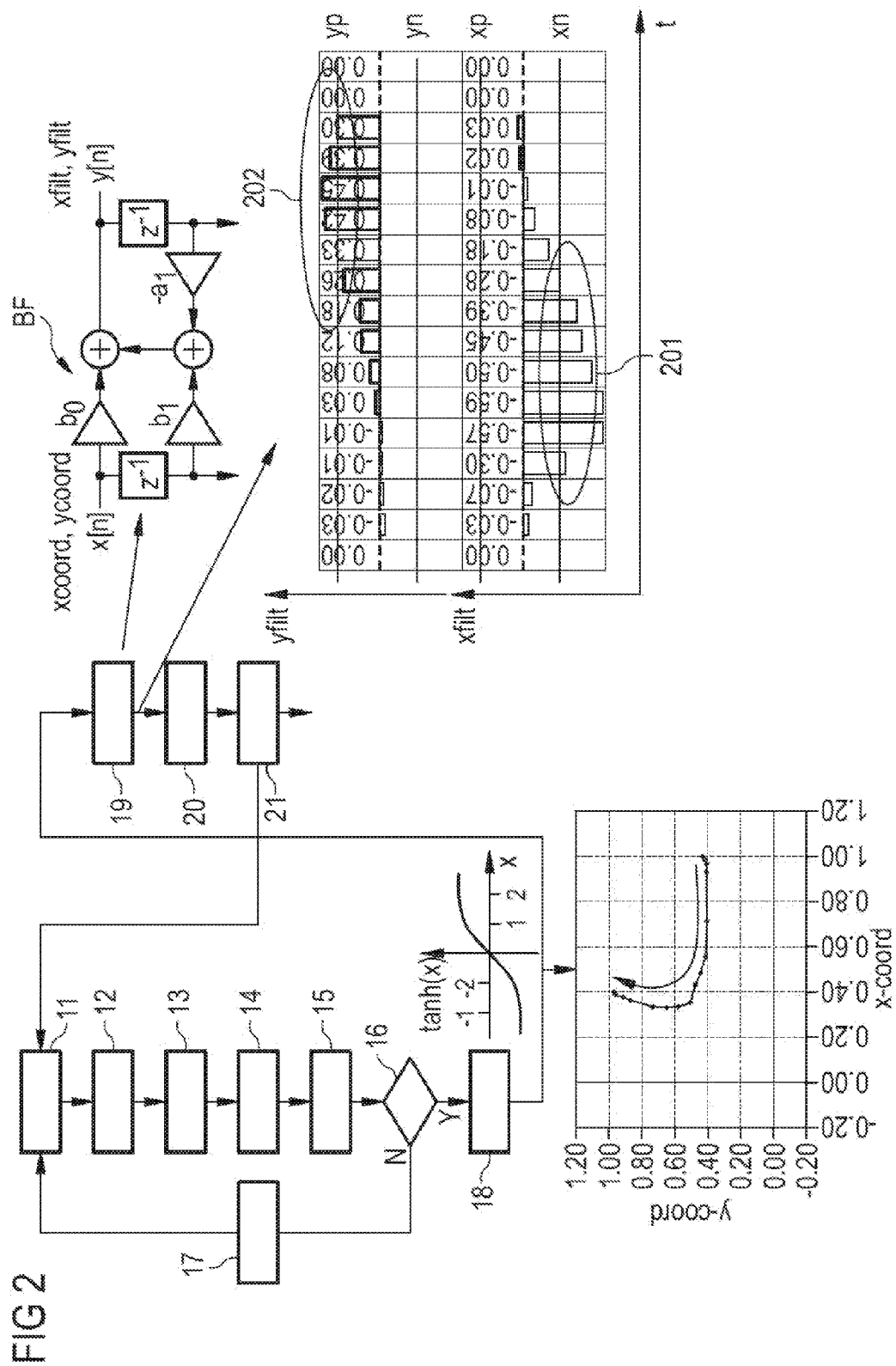

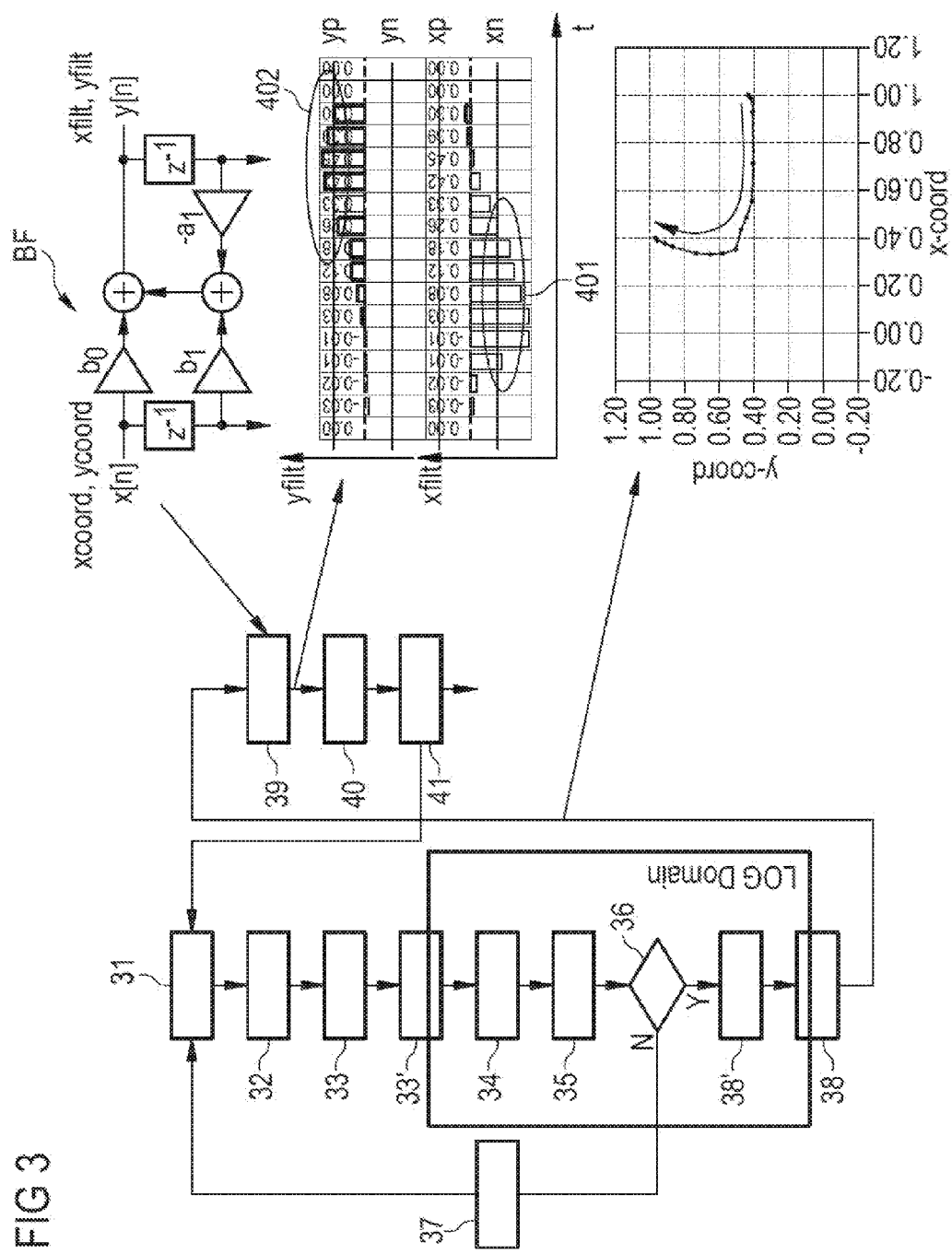

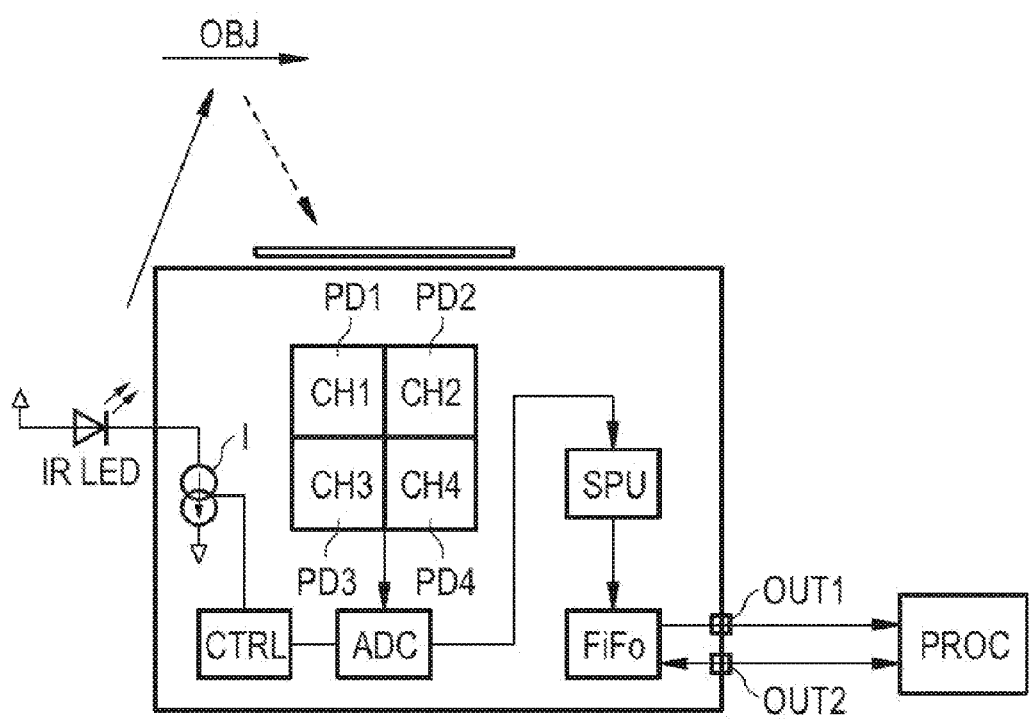

METHOD FOR GESTURE DETECTION, OPTICAL SENSOR CIRCUIT, IN PARTICULAR AN OPTICAL SENSOR CIRCUIT FOR GESTURE DETECTION, AND OPTICAL SENSOR ARRANGEMENT FOR GESTURE DETECTION

The present invention relates to a method for gesture detection, to an optical sensor circuit, in particular to an optical sensor circuit for gesture detection, and to an optical sensor arrangement for gesture detection.

BACKGROUND OF THE INVENTION

Gesture detection provides a convenient way to control operation of a mobile device like a Smartphone by means of a finger or pen. For example, it allows users to simply interact with software and hardware without the need of a separate keyboard. Commonly touch screens are used and the position and specific movement of a finger or pen touching the screen is recorded by the system and translated into certain actions, like flipping a page of a virtual book or starting and interacting with an application. In such cases, however, the screen has to be touched and usually needs to be turned on to be interfaced.

SUMMARY OF THE INVENTION

According to an implementation, a method for gesture detection comprises pre-processing and main-processing steps. The pre-processing comprises emitting light using a light-emitting device and generating of directional sensor signals by detection of a fraction of the emitted light reflected back by means of a movable object using a directional light sensor array. The directional sensor signals are generated as a function of time.

The main processing comprises calculating time-dependent coordinates using the directional sensor signals. The coordinates are indicative of a position of the object with reference to a plane being parallel to a principle plane of the light sensor array. Finally, a movement of the object is detected depending on the timing of the coordinates.

The movement of the object provides a way to identify gestures optically and enhances user interfaces, for example turning a page of a virtual book can be done by a simple right left gesture above the surface of a mobile device). New user interface interactions are possible like fine adjustment of objects in the user interface. There is no need for activating and touching a touch screen which also saves considerable amount of power. The procedure operates by measuring the light reflection of the emitted light with a directional optical sensor and can detect the gesture by the timing difference between the reflections.

Optionally, the time dependency of the directional sensor signals and consequently of the coordinates is realized by generating the directional sensor signals in a cyclic fashion. For example, the emission of light can be pulsed with pulse-on phases followed by pulse-off phases. During the time the pulse is on a corresponding directional sensor signal is generated. Another directional sensor signal is generated at a later time, i.e. in a later cycle. This way the time dependency is established by consecutive cycles of signal generation. The calculating of coordinates preserves the time-dependency of the directional sensor signals and thus results in time-dependent coordinates, i.e. a motion or gesture. The term "timing" in this respect relates to the time dependency of the coordinates, in particular to temporal differences. For example, the change of coordinates with time allows identifying slow and fast movements, i.e. slow and fast gestures.

The term "directional light sensor array" relates to a sensor array which detects light in a spatially resolved fashion. The sensor generates directional sensor signals which each can be assigned to a predominant direction from which light entered the array. Further below details of how to implement a directional light sensor array will be discussed.

According to some implementations of the method, the main processing further comprises generating filtered coordinates from the coordinates by means of at least one filter having a time constant. The movement of the object is then detected depending on the timing of the filtered coordinates.

The coordinates are a function of time and consequently the filtering is in time as well. For example, a low pass, high pass or band pass filter or a combination thereof can be used each being defined by appropriate time constants. In this way too slow and/or too fast movements can be filtered out or movement of a certain rate is allowed to pass for further processing.

According to some implementations of the method, the generating of filtered coordinates from the coordinates involves several filters, each filter having a different time constant.

Several filters can be used to assign a rate, i.e. slow or fast, to a movement or gesture. A fast sweep can be assigned to turning a page in a virtual book whereas slow movement can be assigned to scrolling within a page or the like.

According to some implementations of the method, the detecting of movement further depends on comparing, within a predetermined time frame, the coordinates and/or filtered coordinates with detection thresholds, respectively.

Several detection thresholds are defined and assigned to corresponding directions of movement within the principal plane of the light sensor array like up, down, left, and right. The thresholds are then used to monitor detected coordinates over the predetermined time frame to combine the movement along the plane into a gesture. For example, a if the detection thresholds for left and up movement are triggered for a predetermined time frame of 250 ms the movement is translated into a left/up gesture.

According to some implementations of the method, the main processing further comprises estimating a further coordinate by using amplitude of the directional sensor signals. This amplitude is indicative of a position of the object with reference to an axis being orthogonal to the principle plane of the light sensor array.

For example, the amplitude of the directional sensor signals can be derived by summing all directional sensor signals at a given time. The peak value then is an indication of the further coordinate and allows obtaining three-dimensional information about position and movement of the movable object.

According to some implementations of the method, the pre-processing further comprises the steps of generating ambient signals depending on ambient light exposed to the light sensor array. Then, light signals are generated depending on the fraction of emitted light reflected to the light sensor array by means of the object. From the light signals and the ambient sensor signals the directional sensor signals are adjusted and calculated.

During operation the light sensor array will be exposed to both ambient light and eventually light reflected from the object. In order to improve detection the ambient light needs to be accounted for. For example, if the emission of light is pulsed the light signals can be detected during pulse-on phases of the emitted light and the ambient signals can be detected during pulse-off phases of the emitted light. A convenient way to adjust the directional sensor signals is given by subtracting the ambient signals from the light signals for offset correction.

According to some implementations of the method, an offset or constant offset can be added or subtracted from each channel. This accounts for crosstalk between the light emitting by the light emitting device and the directional sensor signals.

According to some implementations of the method, the pre-processing further comprises the steps of determining if the each directional sensor signal complies with the respective threshold value. Then, the directional sensor signals complying with their respective threshold values are provided.

The comparison with respective threshold values allows for noise reduction. This way the directional sensor signals need a certain signal-to-noise ratio in order to be subject to gesture detection. Unwanted triggering of gesture detection can be avoided.

According to some implementations of the method, the coordinates are calculated from a limiting function of the recorded directional sensor signals, in particular calculated from a ratio of the recorded directional sensor signals.

The limiting function is used to restrict the coordinates to a certain interval, e.g. between 0 and 1. This way computational load can be reduced.

According to some implementations of the method, the pre-processing and/or main-processing further comprises the steps of applying a scaling factor to the directional sensor signals and applying a distance function to the scaled directional sensor signals.

According to an implementation, an optical sensor circuit, in particular an optical sensor circuit for gesture detection comprises an input terminal for a light-emitting device to be connected. A control unit is connected to the input terminal and an analog-to-digital converter is connected to the control unit. A directional light sensor array is arranged and coupled to the control unit. Finally, a signal processing unit is connected to the analog-to-digital converter.

In operation the light sensor is providing directional sensor signals which are indicative for a fraction of the emitted light reflected back by means of a movable object. The signal processing unit records the directional sensor signals as a function of time, the eventually pre-processed directional sensor signals can now be provided at an output terminal.

The optical sensor circuit provides a means to record and/or detect the movement of the object, i.e. provides a way to identify gestures optically and enhances user interfaces, for example turning a page of a virtual book can be done by a simple right left gesture above the surface of a mobile device). There is no need for activating and touching a touch screen which also saves considerable amount of power. The procedure operates by measuring the light reflection of the emitted light with a directional optical sensor and can detect the gesture by the timing difference between the reflections.

The signal processing unit can be designed for performing the procedural steps of pre-processing and/or main-processing according the method for gesture detection discussed above.

According to some implementations of the optical sensor circuit, the analog-to-digital converter either comprises a linear analog-to-digital converter, a logarithmic analog-to-digital converter or a linear analog-to-digital converter further comprising a stage for converting from linear to logarithmic domain.

Depending on whether the pre-processing and/or main processing is done in a linear or logarithmic domain, the appropriate analog-to-digital converter is chosen. In fact, in the logarithmic domain, i.e. using logarithmic analog-to-digital converter or a linear analog-to-digital converter further comprising a stage for converting from linear to logarithmic domain, dynamic range can be improved and computational demands can be reduced, e.g. square root can be reduced to division by 2.

According to some implementations of the optical sensor circuit, the light sensor array comprises directional photodiodes, each photodiode being arranged within the light sensor array such as to detect light in a predominant direction.

According to some implementations of the optical sensor circuit, each directional photodiode is placed in front of an end of a channel within the light sensor array having a principle axis defining the predominant direction, respectively.

According to some implementations of the optical sensor circuit, the signal processing unit comprises a signal recording unit to record directional sensor signals as a function of time and an offset compensation unit to adjust an offset in the directional sensor signals.

As discussed above, the time dependency of the directional sensor signals is realized by generating the directional sensor signals in a cyclic fashion. The signal recording unit implements a cycle to repeatedly generate the directional sensor signals.

For example, the emission of light can be pulsed with pulse-on phases followed by pulse-off phases. During the time the pulse is on a corresponding directional sensor signal is generated. Another directional sensor signal is generated at a later time, i.e. in a later cycle. This way the time dependency is established by consecutive cycles of signal generation. The term "unit" hereinafter will be used to denote a hardware component such as control logic or ASIC, or a process which can be run as software in a device like a microcontroller or processor.

During operation the light sensor array will be exposed to both ambient light and eventually light reflected from the object. In order to improve detection the ambient light needs to be accounted for which is done in the offset compensation unit. For example, if the emission of light is pulsed the light signals can be detected during pulse-on phases of the emitted light and the ambient signals can be detected during pulse-off phases of the emitted light. A convenient way to adjust the directional sensor signals is given by subtracting the ambient signals from the light signals for offset correction.

According to an implementation, an optical sensor arrangement for gesture detection comprises an optical sensor circuit as previously described and further comprises a calculation unit connected to the output terminal of the optical sensor circuit. The calculation unit comprises a coordinate unit to calculate coordinates of an object in a plane parallel to a principle plane of the optical sensor circuit as a function of the recorded directional sensor signals. A filter unit is provided to detect a movement of the object depending on the timing of the filter coordinates.

The calculating of coordinates preserves the time-dependency of the directional sensor signals and thus results in time-dependent coordinates, i.e. a motion or gesture. The term "timing" in this respect relates to the time dependency of the coordinates, in particular to temporal differences. For example, the change of coordinates with time allows identifying slow and fast movements, i.e. slow and fast gestures.

The coordinates are a function of time and consequently the filter unit comprises at least one filter with a certain time constant. For example, a low pass, high pass or band pass filter or a combination thereof can be used each being defined by appropriate time constants. In this way too slow and/or too fast movements can be filtered out or movement of a certain rate is allowed to pass for further processing.

According to some implementations of the optical sensor arrangement, the calculation unit comprises a comparison unit to compare, within a predetermined time frame, the coordinates and/or filtered coordinates with detection thresholds, respectively.

Several detection thresholds are defined and assigned to corresponding directions of movement within the principal plane of the light sensor array like up, down, left, and right. The thresholds are then used to monitor detected coordinates over the predetermined time frame to combine the movement along the plane into a gesture. For example, a if the detection thresholds for left and up movement are triggered for a predetermined time frame of 250 ms the movement is translated into a left/up gesture.

According to some implementations of the optical sensor arrangement, the calculation unit and/or signal processing unit comprises a function unit to scale the directional sensor signals and to apply a distance function to the scaled directional sensor signals.

In the following, the principle presented above will be described in more detail with respect to drawings in which exemplary embodiments are presented.

BRIEF DESCRIPTION OF THE DRAWINGS

FIG. 1A shows an exemplary embodiment of an optical circuit according to the principle presented;

FIG. 1B shows an exemplary embodiment of a directional light sensor array according to the principle presented;

FIG. 2 shows an exemplary embodiment of gesture detection according to the principle presented;

FIG. 3 shows another exemplary embodiment of gesture detection according to the principle presented;

FIG. 4 shows an exemplary embodiment of an optical sensor arrangement according to the principle presented.

DETAILED DESCRIPTION

Figure 5:
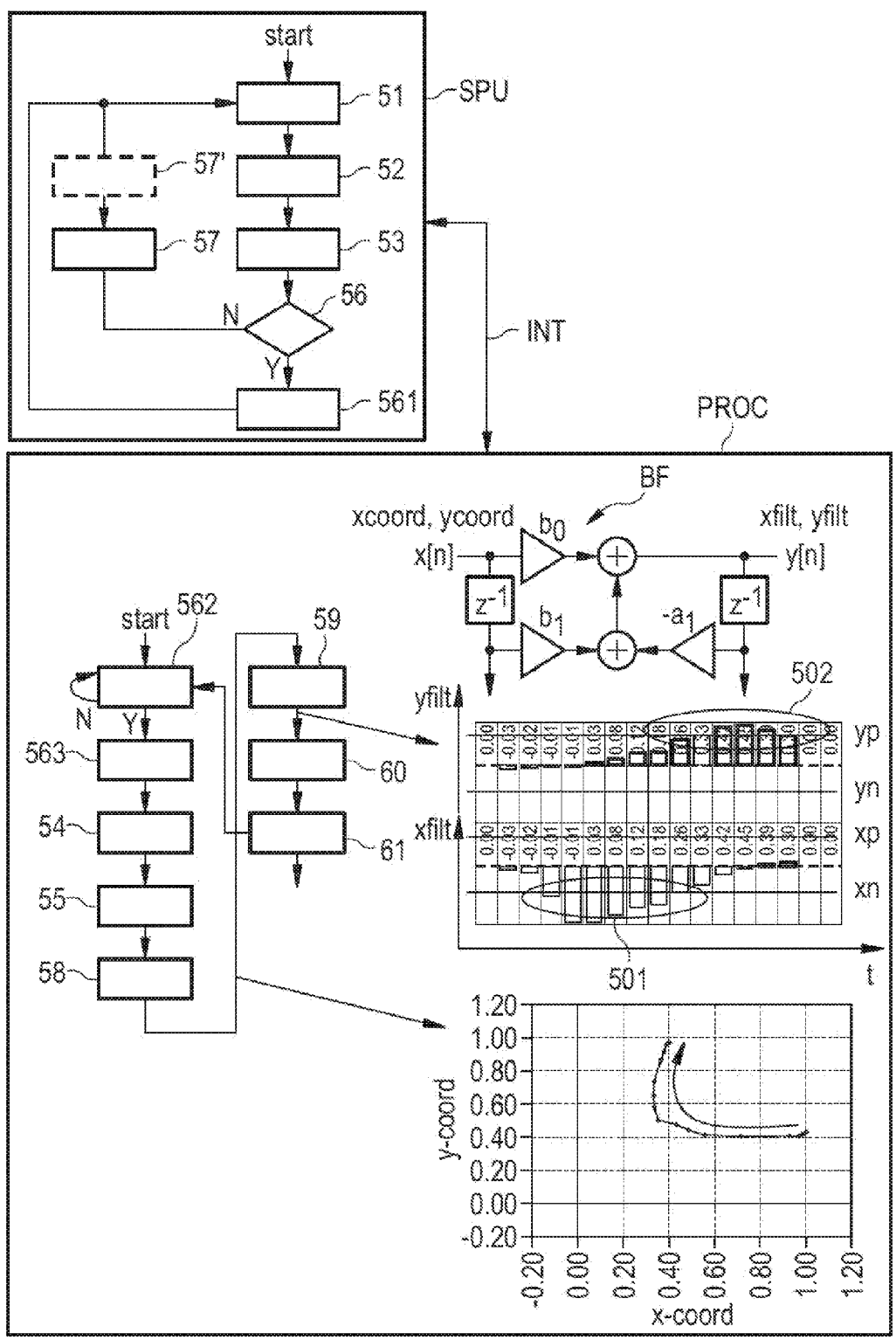
FIG. 5 shows another exemplary embodiment of gesture detection according to the principle presented.

FIG. 1A shows an exemplary embodiment of an optical sensor circuit according to the principle presented. The circuit comprises an input terminal IN1, a current source I, a control unit CTRL, an analog-to-digital converter ADC and a signal processing unit SPU. Furthermore, the optical sensor circuit comprises a directional light sensor array LSA comprising four photodiodes PD1, PD2, PD3, and PD4 and will be discussed in more detail with respect to FIG. 1B. The light sensor array LSA is covered by an infrared filter IR_FLT which is connected to the optical sensor circuit or, alternatively, forms part of a housing into which the optical circuit is embedded.

The input terminal IN1 is used for connecting a light-emitting device IR_LED to the optical sensor circuit. Preferably, the light-emitting device is an infrared light-emitting diode. The control unit CTRL is connected to the input terminal IN1 and to an analog-to-digital converter ADC. The directional light sensor array is coupled to the analog-to-digital converter ADC. The signal processing unit SPU is connected to the analog-to-digital converter ADC and to an output terminal OUT1.

In operation of the optical sensor circuit the light-emitting device IR_LED is connected to the circuit and emits light. The details of light emission are controlled by means of the control unit CTRL which also drives the current source I to provide current to the light-emitting device IR_LED. Optionally, the light-emitting device IR_LED emits pulses of infrared light in a sequence of pulse-on and pulse-off determined by a duty cycle, e.g. depending on a system clock.

Eventually, the emitted light strikes an object OBJ which generally is allowed to move. Such an object may be a finger of a person using a mobile device into which the optical sensor circuit is embedded. Depending of the position of the object OBJ a certain amount of light is reflected back to the optical sensor circuit and can be detected by the directional light sensor array as directional sensor signals. Each of the four photodiodes generates a respective directional sensor signal CH1, CH2, CH3, and CH4, which will be called a channel signal hereinafter. In fact, the terms directional sensor signal and channel signal can be used interchangeably, e.g. a first photodiode PD1 generates a first channel signal CH1, and a second photodiode PD2 generates a second channel signal CH2, and so on. Due to the arrangement of the photodiodes and their specific implementation (see FIG. 1B for details) the directional sensor signals are indicative of a position from which the reflected light originates at the time of measurement. Recording successive directional sensor signals at different times, i.e. as a function of time, not only allows for determining position but also movement of the object OBJ.

The further processing is at least partly performed in the signal processing unit SPU and comprises at least pre-processing and/or main-processing according to a gesture detection algorithm. Details of the pre-processing and main-processing steps will be explained with reference to FIGS. 2 and 3. Optionally, the signal processing unit SPU comprises a micro-controller or processor. This way the processing of the directional sensor signals CH1, CH2, CH3, and CH4 can be realized by dedicated programming of the signal processing unit SPU. In addition or alternatively the according processing steps can be implemented by appropriate hardware as well, e.g. by control logic or as an application-specific integrated circuit (ASIC).

FIG. 1B shows an exemplary embodiment of a directional light sensor array according to the principle presented. Each of the photodiodes PD1, PD2, PD3, and PD4 is placed in front of an end of a channel CHL. The channel is defined by openings O1, O2, O3 in a layer of several metal sheets M1, M2, M3 placed on top of each other with certain spacing. The openings are shifted with respect to each other so as to define the channel orientation pointing towards a certain direction. An axis of the respective channel defines a predominate direction from which light can enter and hit the respective photodiode. The predominant direction therefore determines whether a photodiode is sensitive to light originating from that particular direction.

In the light sensor array LSA the four photodiodes PD1, PD2, PD3, and PD4 each feature a different predominant direction. Optionally, the photodiodes are aligned in a matrix along an orthogonal coordinate system defining a respective axes x, y (see FIG. 1A). This way the channels and predominant directions are assigned to different directions for each of the four photodiodes PD1, PD2, PD3, PD4, like up, down, left, and right. Optionally, directions up, down and directions left, right are assigned to channels CH1, CH2 and CH3, CH4, respectively. In this way, the sensor signals generated by the photodiodes, i.e. the directional sensor signals, are indicative of a direction within the coordinate system from which light of a certain amount originates. It is apparent to those skilled to the art that different numbers of photodiodes, for example three photodiodes, can also be implemented as directional light sensor array.

FIG. 2 shows an exemplary embodiment of gesture detection according to the principle presented. Generally, the procedure comprises two cycles which will be denoted pre-processing and main processing hereinafter. The actual procedural steps included in the pre-processing and main processing can be changed and are used for explanation purposes. However, as will be explained below, some procedural steps put higher demands on computational or hardware requirements than others. Thus, it is convenient to denote those steps with rather low demands as pre-processing steps and those with higher demands as main processing steps. In the embodiments discussed below this separation is used to assign the procedural steps to different hardware units so these units can be implemented to account for the different demands. Hence, the pre-processing can be run on the signal processing unit SPU and the main processing can be run on a separate processing unit PROC (see FIG. 4 for further details). Without departing from the general principle presented here, however, both pre-processing and main processing can be implemented on a single unit as well, e.g. using the signal processing unit SPU.

The gesture detection can be initialized with a start signal which conveniently can be synchronized to a duty cycle of the pulsed infrared emission of light by means of the light-emitting diode. Step 11 then starts a conversion or pre-processing cycle, for example one conversion cycle every 20 milliseconds or any other time to be set. As will be discussed below during a single conversion cycle directional sensor signals CH1, CH2, CH3, CH4 are recorded using the light sensor array LSA, i.e. directional photodiodes PD1, PD2, PD3, PD4. The conversion cycle is repeated so as that successive conversion cycles establish a time dependency of the directional sensor signals CH1, CH2, CH3, and CH4.

In a step 12 the respective directional sensor signals CH1, CH2, CH3, and CH4 are measured, both with and without infrared light emitted from the light-emitting diode IR_LED. For example, this measurement can be synchronized to the duty cycle of consecutive pulse-on and pulse-off phases of the infrared light-emitting diode IR_LED. In a following step 13 the detected directional sensor signals CH1, CH2, CH3, and CH4 are offset-corrected. In this respect the directional sensor signals which are collected during a pulse-on phase of the emitted light, i.e. during emission of infrared light are denoted light signals and sensor signals collected during a pulse-off phase of the light emitted by the light-emitting diode are denoted ambient signals. The light signals include contributions of both ambient light originating from various sources in the surroundings and eventually contributions of the emitted light reflected back from the moving object OBJ, whereas the ambient signals only collect ambient light. The directional sensor signals are then generated by adjusting the light signals with the ambient signals. This may for example be achieved by subtracting the ambient signals for each of the channels CH1, CH2, CH3, and CH4 from the respective light signals, again for each channel CH1, CH2, CH3, CH4. This results in offset corrected directional sensor signals. Additionally, an offset or constant offset can be added or subtracted from each channel. This accounts for crosstalk between the light emitting by the light emitting device and the directional sensor signals.

In a next step 14, each of the directional sensor signals, i.e. each channel CH1, CH2, CH3, CH4 is scaled by using a scaling factor. This allows for both adjusting the dynamic range of the detection but also makes the predominant direction more prevailing. The scaling factor can be set or, for example, effectively normalizing the directional sensor signals to a reference, e.g. a maximum signal value.

In step 15, a square root is calculated for each directional sensor signal. The square root of the channel signals CH1, CH2, CH3, CH4 is a measure of distance with respect to the orthogonal coordinate system defined by axes x, y. The square root provides a measure for easier processing, like a threshold comparison as will be performed together with step 16. Steps 14 and 15, however, are optional and can also be moved or be repeated in the main processing.

Step 16 corresponds to a threshold comparison. For example, the channel signals CH1 and CH2 are compared with a threshold TX and channel signals CH3 and CH4 are compared to a threshold value TY. Furthermore, optionally the sum of channel signals CH1+CH2+CH3+CH4 is compared to a threshold value TSUM. If, however, the square root was previously calculated in step 15, then the square root of each channel signal and sum of square roots is compared to the above-mentioned threshold values, respectively.

The comparison to threshold values gives a convenient means to determine whether a moving object OBJ was in a certain spatial proximity to the optical sensor circuit, and allows to judge whether the corresponding directional sensor signals should be subject to gesture determination. If the comparison to the threshold values is negative, then in step 17 all internal variables, for example from a filter (to be explained below) are reset and the procedure returns to step 11 to start a new conversion cycle. In case of a positive threshold comparison, the pre-processing procedure effectively ends and main-processing is entered.

In order to further reduce the calculation load on the signal processing unit SPU, optionally, a step 18' can be introduced which applies a limit function to limit the numeric values of the channel signals to an interval between 0 and 1.

In step 18 coordinates x_coord, y_coord are determined indicating the position with reference to a reference plane parallel to a principle plane x, y of the optical sensor circuit. The coordinates are determined from the directional sensor signals CH1, CH2, CH3, and CH4. For example, coordinates x_coord, y_coord can be determined from a ratio of directional sensor signals CH1, CH2, CH3, and CH4:

$$x\_coord=(CH1-CH2)/(CH1+CH2)$$

$$y\_coord=(CH3-CH4)/(CH3+CH4)$$

or, alternatively, from a tangens hyperbolicus function tank of directional sensor signals:

$$x\_coord=\tan h(CH1/CH2)$$

$$y\_coord=\tan h(CH3/CH4).$$

The determination of coordinates is performed separately for set of directional sensor signals from each conversion cycle and the coordinates can be assigned a different time according to the conversion cycle during which they have been recorded such that the set of all coordinates x_coord, y_coord establishes an equation of motion within the reference plane x, y.

In the following step 19 the previously determined time-dependent coordinates x_coord, y_coord are applied to a band pass filter having a certain time constant to generate filtered coordinates xfilt, yfilt. For example, the band pass filter allows signals with a frequency of 2 Hz to 15 Hz to pass (see reference numeral BF for further illustration). The band pass filter can be used to adjust the detection timings to reject too fast or too slow movements, for example designed by low pass filters to allow quick or slow gestures. Using several different band pass filters allows triggering different gestures depending on the movement speed of the object above the detection photo diodes, for example fast movement flip pages, slow movement scroll within a page.

The filtered coordinates xfilt, yfilt are then further compared to detection thresholds xn, xp, yn, yp. The detection thresholds are assigned to respective directions within the coordinate system x, y, for example, up, down, left, and right, respectively. The direction of movement can be determined from the filtered coordinates. If a detection threshold is triggered for a certain time, i.e. during a predetermined time-frame, then a movement into the corresponding direction is detected. If, at the same time, another detection threshold is triggered during the predetermined time-frame then a movement into that direction is detected as well. This way a two dimensional movement or gesture inside the reference plane x, y can be determined.

An example is depicted by reference numerals 201, 202 in the drawing. The graph shown depicts the filtered coordinates xfilt, yfilt as a function of time t. Reference numeral 201 shows a first predetermined time-frame, for example 250 milliseconds, and reference 202 shows another predetermined time-frame (for example also 250 milliseconds). If the xn threshold and the yp threshold are triggered within these predetermined timeframes, a gesture for a sweep from right bottom to left top is reported. From the amplitudes of the filtered coordinates movement along all four directions within the reference coordinate system can be determined. If such detection trigger condition is achieved, in step 21 a corresponding gesture detection trigger is reported to higher level units. The detection then returns back to step 11 to wait for the next conversion cycle to start.

FIG. 3 shows another exemplary embodiment of gesture detection according to the principle presented. The procedure only differs from the embodiment presented with respect to FIG. 2 in the following steps. If not mentioned otherwise, the steps indicated with a similar reference numeral correspond to the steps presented above. The procedure shown in FIG. 2 can be called a linear procedure, whereas the one presented here with respect to FIG. 3 at least partly operates in a logarithmic domain as indicated by a grey box in the drawing.

After initialization in step 31 and following measurement and offset correction of directional sensor signals in steps 32 and 33 in a step 33' the logarithm function log is applied to the offset corrected directional sensor signals. This procedure is used to reduce the calculation load for the following steps of pre-processing and main-processing.

In step 34 a scaling factor is added or subtracted in order to scale the offset corrected channel signals. The distance function applied in step 35 simplifies in the logarithmic domain to a division by 2 instead of taking the square root for each channel as with the linear procedure. Again, in step 36 the resulting processed sensor signals are compared to threshold values TX, TY, TSUM. If the comparison is negative then, via resetting internal variables in step 37, the procedure returns to step 31 to start a new conversion cycle. In case of a positive comparison, however, the pre-processing continues by applying to the channel signals a limiting function to limit the signal values to an interval like 0 to 1 and further reduce calculation load for the following coordinate determination.

Coordinates are determined in step 38, but instead of taking a tangens hyperbolicus tank or the above-mentioned ratio, an exponential exp of the channel signals CH1, CH2, CH3, and CH4 is calculated:

$x\_coord = \exp(CH1/CH2)$ $y\_coord = \exp(CH3/CH4)$.

Steps 39, 40, 41 correspond to band pass filtering, threshold comparison with detection threshold values and report detection trigger, respectively. Reference numerals 401, 402 relate to comparison with the detection threshold values within the given time frame 401, 402, respectively. FIG. 4 shows an optical circuit arrangement according to the principle presented. The circuit shown is based on the embodiment of FIG. 1 and only the differences will be discussed hereinafter. Because of the different computational load of pre-processing and main processing it can be convenient to assign the corresponding procedural steps to different hardware components.

The signal processing unit SPU in this embodiment is used to run the steps of the pre-processing procedure and records the direction sensor signals in a first-in first-out unit FIFO connected to the signal processing unit SPU. The steps of main-processing are performed in a dedicated processing unit PROC which may be part of the optical sensor circuit itself as shown in FIG. 1 or, as depicted in FIG. 4, is a separate unit which is external to the optical sensor circuit.

For a mobile phone, for example, the optical sensor circuit is located on top of the phone. The processing unit PROC can be implemented as the application processor or baseband processor of the phone. The first-in first-out unit FIFO is used to offload the processing unit PROC from the time critical task of gesture detection and additionally allows a sleep mode of the processing unit PROC to reduce power consumption. The processing unit PROC wakeup is only triggered through an interrupt line INT via terminals OUT1, OUT2 if the light sensor array LSA detects an object OBJ in view and has data pushed into the first-in first-out unit FIFO.

FIG. 5 shows an exemplary embodiment of gesture detection according to the principle presented. The procedure is split into two parts along the lines of the partitioning implementation of FIG. 4, i.e. the procedural steps of pre-processing and main-processing. Thus, optical sensor circuit does not handle computational intensive tasks like dividing or taking a square root. For easier comparison the steps of pre-processing are shown as being part of the signal processing unit SPU and the steps of main-processing as being part of the processing unit PROC. As discussed above, the procedural steps can be realized by dedicated programming of the signal processing unit SPU and processing unit PROC. In addition, or alternatively, the according processing steps can be implemented by appropriate hardware as well, e.g. by control logic or as an application-specific integrated circuit (ASIC). The partitioning implementation will be discussed with respect to the linear gesture detection discussed with respect to FIG. 2. Generally, however, the logarithmic gesture detection discussed with respect to FIG. 3 or combinations thereof can be implemented as well. The partitioned procedure only differs from the embodiment presented with respect to FIG. 2 in the following steps. If not mentioned otherwise, the steps indicated with a similar reference numeral correspond to the steps presented above.

After initialization at start a conversion cycle starts at step 51. Measurement and offset correction are executed in steps 52 and 53. The offset corrected directional sensor signals are then compared to thresholds TX, TY, and TSUM in step 53. Depending on the comparison the conversion cycles returns back to step 51 via reset in step 57. Optionally the returning involves step 57' in which a pause of a certain amount of time, e.g. 50 ms, is introduced to save power.

If the comparison to thresholds TX, TY, and TSUM in step 53 was positive the corresponding directional sensor signals are saved into the first-in first-out unit FIFO in step 561. The saved directional sensor signals are saved together with a time marker indicating the conversion cycle during which the data was recorded. This way the necessary time information to derive a motion from directional sensor signals is preserved. When saving is completed the system returns to step 51 in order to start a new conversion cycle. This effectively ends the pre-processing. As discussed already above, the pre-processing can be complemented by additional steps like scaling 54, calculation of a square root 58, and applying a limiting function. These steps can be moved between pre-processing and main processing.

The signal processing unit SPU and processing unit PROC are interconnected via interface INT. The interface can be used to transmit an interrupt between the two units, e.g. to initialize the main processing at step 562. The processing unit PROC will continuously look such an interrupt and only proceed if the interrupt is detected. In case of further proceeding in step 563 the directional sensor signals and their associated time markers will be read out from the first-in first-out unit FIFO. After scaling 54 and calculation of a square root 58 the so processed sensor signals undergo coordinate determination in step 58, band pass filtering in step 59, comparison with detection thresholds in step 60 (see also time intervals 501, 502), and finally eventually triggering a gesture detection in step 61.

In an embodiment not shown two different predetermined time frames can be used for detection, e.g. check if an object is in proximity on a longer timeframe, and once an object is detected use a short timeframe to monitor the movement.

The change of timing will reduce the power required for the gesture detection as the optical sensor circuit only runs at full speed once an object is in view.

In another embodiment not shown a third dimension, e.g. a height of the object OBJ over the reference plane x, y can be deduced from the directional sensor signals CH1, CH2, CH3, and CH4. This can be achieved by evaluating the amplitude of the channel signals, for example by summing all channel signals. The peak amplitudes then is a measure of a position above the reference plane x, y.

The invention claimed is:

1. A method for gesture detection comprising pre-processing and main-processing steps,
wherein the pre-processing comprises:
emitting light in a pulsed manner with pulse-on phases followed by pulse-off phases using a light emitting device,
generating ambient signals depending on ambient light incident on a directional light sensor array during pulse-off phases of the emitted light,
generating light signals as a function of time by detecting a fraction of the emitted light reflected by means of a movable object during pulse-on phases of the emitted light using the directional light sensor array, and
calculating directional sensor signals as a function of time by adjusting the light signals with the ambient signals,
wherein the main-processing comprises:
calculating coordinates as a function of time by using the directional sensor signals, being indicative of a position of the object with reference to a plane parallel to a principal plane of the directional light sensor array, and
detecting a movement of the object depending on the timing of the coordinates,
wherein the directional light sensor array comprises directional photo-diodes, each photo-diode being arranged within the directional light sensor array to detect light in a predominant direction, and
wherein the directional light sensor is implemented as a single sensor module with channels therein, each channel corresponding to a respective predominant direction.

2. The method for gesture detection of claim 1, wherein the main processing further comprises:
generating filtered coordinates from the coordinates by means of at least one filter having a time constant, and
detecting the movement of the object depending on the timing of the filtered coordinates.

3. The method for gesture detection of claim 2, wherein the generation of filtered coordinates from the coordinates involves several filters, each filter having a different time constant.

4. The method for gesture detection of claim 2, wherein the generation of the filtered coordinates involves band pass filtering.

5. The method for gesture detection of claim 2, wherein the detection of the movement further depends on comparing, within a predetermined time-frame, the coordinates and/or filtered coordinates with detection thresholds, respectively.

6. The method for gesture detection of claim 1, wherein the main processing further comprises estimating a further coordinate by using an amplitude of the directional sensor signals, being indicative of a position of the object at a given time and with reference to an axis being orthogonal to a principal plane of the directional light sensor array.

7. The method for gesture detection of claim 1, wherein the pre-processing further comprises the step of adding or subtracting an offset value, in particular a constant offset value, to each of the directional sensor signals.

8. The method for gesture detection of claim 1, wherein the pre-processing further comprises the steps of:
determining for each of the directional sensor signals if it complies with respective threshold values,
providing those of the directional sensor signals that comply with their respective threshold values.

9. The method of claim 1, wherein the coordinates are limited to an interval by applying a limiting function to the directional sensor signals, in particular to a ratio of the directional sensor signals.

10. The method for gesture detection of claim 1, wherein the pre-processing and/or main-processing further comprises the steps of:
applying a scaling factor to the directional sensor signals and/or
applying a distance function to the directional sensor signals.

11. The method for gesture detection of claim 1, wherein the coordinates are calculated as a first coordinate x_coord and as a second coordinate y_coord according to the formulae $$x\_coord = (CH1 - CH2)/(CH1 + CH2) \text{ and}$$

$$y\_coord = (CH3 - CH4)/(CH3 + CH4)$$

and/or according to the formulae $$x\_coord = \tan h(CH1/CH2) \text{ and}$$

$$y\_coord = \tan h(CH3/CH4)$$

and/or according to the formulae $$x\_coord = \exp(CH1/CH2) \text{ and}$$

$$y\_coord = \exp(CH3/CH4),$$

with CH1, CH2, CH3 and CH4 representing the directional sensor signals.

12. An optical sensor circuit, in particular an optical sensor circuit for gesture detection, comprising:
an input terminal for a light emitting device to be connected, the light emitting device being configured to emit light in a pulsed manner with pulse-on phases followed by pulse-off phases,
a control unit connected to the input terminal,
an analog-to-digital converter connected to the control unit,
a directional light sensor array coupled to the control unit, and
designed
to generate ambient signals depending on ambient light incident on the directional light sensor array during pulse-off phases of the emitted light, and
to generate light signals indicative of a fraction of the emitted light reflected by means of a movable object during pulse-on phases of the emitted light, and
a signal processing unit comprising an output terminal, the signal processing unit connected to the analog-to-digital converter and designed for recording the ambient signals and the light signals and for calculating and recording directional sensor signals as a function of time by adjusting the light signals with the ambient signals,
wherein the directional light sensor array comprises directional photo-diodes, each photo-diode being arranged within the directional light sensor array to detect light in a predominant direction, and
wherein the directional light sensor is implemented as a single sensor module with channels therein, each channel corresponding to a respective predominant direction.

13. The optical sensor circuit of claim 12, wherein the analog-to-digital converter comprises
a linear analog-to-digital converter,
a logarithmic analog-to-digital converter or
a linear analog-to-digital converter further comprising a stage for converting from linear to logarithmic domain.

14. The optical sensor circuit of claim 12, wherein each directional photo-diode is placed in front of an end of a channel within the directional light sensor array, each channel having a principal axis defining a respective predominant direction.

15. The optical sensor circuit of claim 12, wherein the signal processing unit comprises
a signal recording unit to record directional sensor signals as a function of time and
an offset compensation unit to adjust an offset in the directional sensor signals.

16. An optical sensor arrangement for gesture detection comprising an optical sensor circuit of claim 12, and further comprising a calculation unit connected to the output terminal, wherein the calculation unit comprises
a coordinate unit to calculate coordinates as a function of time and indicative of a position of the object in a plane parallel to a principal plane of the optical sensor circuit depending on the directional sensor signals, and
a filter unit to detect a movement of the object depending on the timing of filtered coordinates.

17. The optical sensor arrangement of claim 16, wherein the filter unit comprises one or more band pass filters and is configured to reject movements with a velocity within one or more velocity ranges.

18. The optical sensor arrangement of claim 16, wherein the calculation unit comprises a comparison unit to compare, within a predetermined timeframe, the coordinates and/or the filtered coordinates with detection thresholds, respectively.

19. The optical sensor arrangement of claim 16, wherein the calculation unit and/or signal processing unit comprises a function unit to scale the directional sensor signals and to apply a distance function to the scaled directional sensor signals.

20. The optical sensor circuit of claim 12, wherein each channel is defined by openings in a layer of several metal sheets placed on top of each other with certain spacing and the openings are shifted with respect to each other so as to define the respective principal axis defining the respective predominant direction.

21. A method for gesture detection comprising pre-processing and main-processing steps,
wherein the pre-processing comprises:
emitting light using a light emitting device, and
generating of directional sensor signals as a function of time by detecting a fraction of the emitted light reflected by means of a movable object using a directional light sensor array, and
wherein the main-processing comprises:
calculating coordinates as a function of time by using the directional sensor signals, being indicative of a position of the object with reference to a plane parallel to a principal plane of the directional light sensor array, and
detecting a movement of the object depending on the timing of the coordinates,
wherein the directional light sensor array comprises directional photo-diodes, each photo-diode being arranged within the directional light sensor array to detect light in a predominant direction, and
wherein the directional light sensor is implemented as a single sensor module with channels therein, each channel corresponding to a respective predominant direction.

* * * * *